(12) United States Patent
Bhushan

(10) Patent No.: US 10,144,044 B2
(45) Date of Patent: Dec. 4, 2018

(54) TREATMENT OF TRADE EFFLUENT FROM FOOD WASTE DISPOSAL SYSTEMS

(71) Applicant: Bharat Bhushan, Surrey (CA)

(72) Inventor: Bharat Bhushan, Surrey (CA)

(73) Assignee: Micron Technologies Holding Inc., Vancouver (CA)

( * ) Notice: Subject to any disclaimer, the term of this patent is extended or adjusted under 35 U.S.C. 154(b) by 293 days.

(21) Appl. No.: 14/850,226

(22) Filed: Sep. 10, 2015

(65) Prior Publication Data

US 2017/0072441 A1 Mar. 16, 2017

(51) Int. Cl.

| | |
|---|---|
| *C02F 3/00* | (2006.01) |
| *B09B 3/00* | (2006.01) |
| *C02F 9/00* | (2006.01) |
| C02F 1/32 | (2006.01) |
| C02F 1/72 | (2006.01) |
| C02F 3/12 | (2006.01) |
| C02F 3/34 | (2006.01) |
| C02F 11/12 | (2006.01) |
| C02F 11/16 | (2006.01) |

(Continued)

(52) U.S. Cl.
CPC ............ *B09B 3/00* (2013.01); *C02F 3/00* (2013.01); *C02F 9/00* (2013.01); *C02F 1/32* (2013.01); *C02F 1/722* (2013.01); *C02F 3/1215* (2013.01); *C02F 3/341* (2013.01); *C02F 3/342* (2013.01); *C02F 3/348* (2013.01); *C02F 11/123* (2013.01); *C02F 11/125* (2013.01); *C02F 11/127* (2013.01); *C02F 11/16* (2013.01); *C02F 2103/22* (2013.01); *C02F 2103/32* (2013.01); *C02F 2203/002* (2013.01); *C02F 2209/005* (2013.01); *C02F 2209/02* (2013.01); *C02F 2209/06* (2013.01); *C02F 2209/08* (2013.01); *C02F 2209/40* (2013.01); *C02F 2303/02* (2013.01)

(58) Field of Classification Search
CPC ...... B09B 3/00; C02F 3/00; C02F 9/00; C02F 3/302; C02F 2209/06; C02F 3/006; C02F 3/34; C02F 3/341; C02F 3/10; C02F 3/101
USPC ........................................ 210/615, 252, 610
See application file for complete search history.

(56) References Cited

U.S. PATENT DOCUMENTS

| | | |
|---|---|---|
| 4,179,374 A | 12/1979 | Savage et al. |
| 4,279,753 A | 7/1981 | Nielson et al. |

(Continued)

FOREIGN PATENT DOCUMENTS

| | | |
|---|---|---|
| CA | 2876477 A1 | 12/2013 |
| WO | 2009049401 A1 | 4/2009 |
| WO | 2016061248 A1 | 4/2016 |

*Primary Examiner* — Claire A Norris
(74) *Attorney, Agent, or Firm* — Oyen Wiggs Green & Mutala LLP

(57) ABSTRACT

A bioprocess comprises regulating pH of trade effluent wastewater, adding and mixing a first bio-additive, adding and mixing a flocculant/coagulant, filtering through a filter device, adding, mixing of a second bio-additive with aeration, and adding and mixing of a third bio-additive with aeration. Treatment can be discontinued or continued by adding and mixing of hydrogen peroxide with aeration, and optionally exposing treated effluent to UV disinfectant. The treated effluent can be recycled or disposed. Compositions of bio-additives 1, 2 and 3 comprise a group of highly selective and effective microorganisms and enzymes that are immobilized on carrier support matrices from a group of alginate, chitosan, polyacrylamides, k-carrageenan and agarose.

18 Claims, 5 Drawing Sheets

(51) Int. Cl.
*C02F 103/22* (2006.01)
*C02F 103/32* (2006.01)

(56) References Cited

U.S. PATENT DOCUMENTS

| | | | | |
|---|---|---|---|---|
| 4,826,601 | A | * 5/1989 | Spratt | C02F 3/1215 |
| | | | | 210/170.08 |
| 2007/0238148 | A1 | 10/2007 | Park et al. | |
| 2008/0190845 | A1 | * 8/2008 | DeLozier | C02F 3/34 |
| | | | | 210/632 |
| 2013/0118969 | A1 | * 5/2013 | Koh | C02F 3/06 |
| | | | | 210/295 |
| 2013/0193068 | A1 | * 8/2013 | Jones | C02F 3/006 |
| | | | | 210/615 |
| 2013/0299422 | A1 | * 11/2013 | Doi | C02F 1/5245 |
| | | | | 210/631 |

* cited by examiner

TREATMENT OF TRADE EFFLUENT FROM FOOD WASTE DISPOSAL SYSTEMS

TECHNICAL FIELD

The present invention relates to treating trade effluent from food waste disposal systems.

CROSS REFERENCE TO RELATED APPLICATIONS

None.

GOVERNMENT SUPPORT

None.

BACKGROUND

Food waste or organic waste management is a global issue. Currently about 40% of edible food goes into waste from its journey from farm's crops to the dining table. About 30-40% of all the waste humans generate is composed of food waste. If not dealt with properly, it may create problems in terms of infections, pollution and unpleasant smells.

Traditional waste management practices include landfills, composting, incinerator, dehydration, pyrolysis and gasification. Food waste diverted to landfills generates methane ($CH_4$), which is much more potent than carbon dioxide ($CO_2$) as a greenhouse gas. It is believed that the vast amount of food currently going to landfills makes a significant contribution to global warming.

Food waste may lead to an increased and wasteful use of chemicals such as fertilizers and pesticides. Transporting food waste requires use of more fuel and more rotting food generates more methane. All waste management practices require transportation and have other logistics and environmental down sides. Space required for new and larger landfills and/or for large-scale composting of food waste may be difficult to find or not available in some areas. As an alternative, incinerators can be pollution-driven expensive operations.

Recently, various municipalities are making and enforcing new regulations requiring the separate disposal of food/kitchen waste from regular waste.

The following terms are abbreviated herein as follows.
'Biological Oxygen Demand' is abbreviated as BOD,
'Chemical Oxygen Demand' is abbreviated as COD,
'Total Suspended Solids' is abbreviated as TSS, and
'Fats, Oils and Grease' is abbreviated as FOG.

According to United Nations Environment Program (UNEP), roughly one third of food produced in the world for human consumption every year, approximately 1.3 billion tonnes, gets lost or wasted.

Commercial food waste disposal systems or food waste digesters resolve many of the above issues. Food waste disposal systems are a relatively promising tool to manage large-scale food waste on-site without the need for further transportation or hauling. Food waste disposal systems convert organic food waste into trade effluent or gray water with help of microbial/enzymes bio-processing within 12-24 hours under controlled environmental conditions. Food waste disposal systems (or food waste digesters) generate trade effluent that is composed of water, fats, oils, fatty acids, proteins, amino acids, lipoproteins, glycoproteins, nucleic acids, a variety of carbohydrates, organic acids, and volatile organic compounds, etc.

Food waste ingredients present in the trade effluent contribute to conventionally higher levels of BOD, COD, TSS, FOG, color and odor.

The most common contaminants present in trade effluent include soluble and insoluble carbon and nitrogen compounds that contribute to BOD.

BOD is a measure of the oxygen required for biological degradation of the contaminants in trade effluent and is generally correlated to the amount of organic material contained in that trade effluent. In other words, the greater the organic matter content of a trade effluent, the higher will be the BOD level of that trade effluent. In order to meet the regulatory trade effluent wastewater discharge standards in most parts of North America and worldwide, the BOD levels must be below 50 mg/L prior to discharge into municipal sewer line. The BOD levels of trade effluent from commercial food waste disposal systems can go as high as 35,000 mg/L. If this trade effluent is discharged into municipal sewer without treatment, it creates extra load for the municipal wastewater treatment plant. Additionally, higher levels of TSS and FOG may cause blockage of sewer pipes and that requires an expensive maintenance.

Currently, there is no reliable technology available that can effectively treat trade effluent generated by the food waste disposal systems or food waste digesters in order to meet global environmental and/or municipal standards.

On-site conversion of organic food waste to water has several economical, logistical and environmental benefits compared to the traditional waste management technologies. Despite all those benefits, the following major reasons act as limiting factors in implementing the organic food waste disposal technology on a large scale. First, an average commercial food waste disposal system/digester with a food waste capacity of 1000 kg per day consumes at least 1000 liters of fresh water per day. Many places in North America and around the world simply can't afford to deliver 1000 liters of fresh water on daily basis to the food waste digester system. Second, the trade effluent produced by most of the commercially available food waste digesters and food waste disposal systems generate relatively higher amounts of BOD, COD, TSS, FOG, color and odor that may not meet municipal regulatory limits. Third, the offensive odor generated by trade effluent is detrimental to the employees working in close proximity. Fourth, there is a general belief, though unscientific and without concrete evidence, among municipal authorities that microorganisms/enzymes discharged along with trade effluent wastewater may harm sewer pipes or the municipal wastewater treatment plant.

There is a need for an effective treatment of trade effluent discharged from food waste disposal systems, preferably that is economical, effective, eco-friendly, reliable, avoids the use of harsh chemical additives, helps meet municipal wastewater discharge standards, and/or could even recycle treated trade effluent wastewater back into the food waste disposal system.

SUMMARY OF INVENTION

A method of treating trade effluent from a food waste disposal system involves depositing trade effluent into a first tank. In the first tank, the pH of the trade effluent is regulated. The trade effluent is mixed with a first bio-additive. The trade effluent is transferred from the first tank into a second tank. The trade effluent is mixed with coagulants/flocculants. The trade effluent is transferred from the second tank to a first filter device which filters out and removes sludge waste from the trade effluent.

The trade effluent is transferred from the first filter device into a third tank wherein the trade effluent is mixed with a second bio-additive. The trade effluent is transferred into a fourth tank in which a third bio-additive is added. The trade effluent and the third bio-additive mixture becomes treated effluent. The treated effluent can then be discharged from the fourth tank.

In an apparatus for treating trade effluent from a food waste disposal system a first connector connects the food waste disposal system to a first tank. The first tank is configured for receiving the trade effluent and mixing it with a pH regulating chemical buffer and a first bio-additive. A second connector connects the first tank to a second tank for transferring the trade effluent into the second tank and mixing the trade effluent with coagulants/flocculants. A third connector connects the second tank to a first filter device, which filters out and removes sludge waste from the trade effluent. A fourth connector connects the first filter device to a third tank which is configured for mixing the trade effluent with a second bio-additive. A fifth connector connects the third tank to a fourth tank which is configured to mix the trade effluent with a third bio-additive wherein the trade effluent and the third bio-additive mixture becomes treated effluent. A discharge outlet is supplied for discharging the treated effluent from the fourth tank.

BRIEF DESCRIPTION OF DRAWINGS

In figures which illustrate non-limiting embodiments of the invention.

DESCRIPTION

Figure 1:
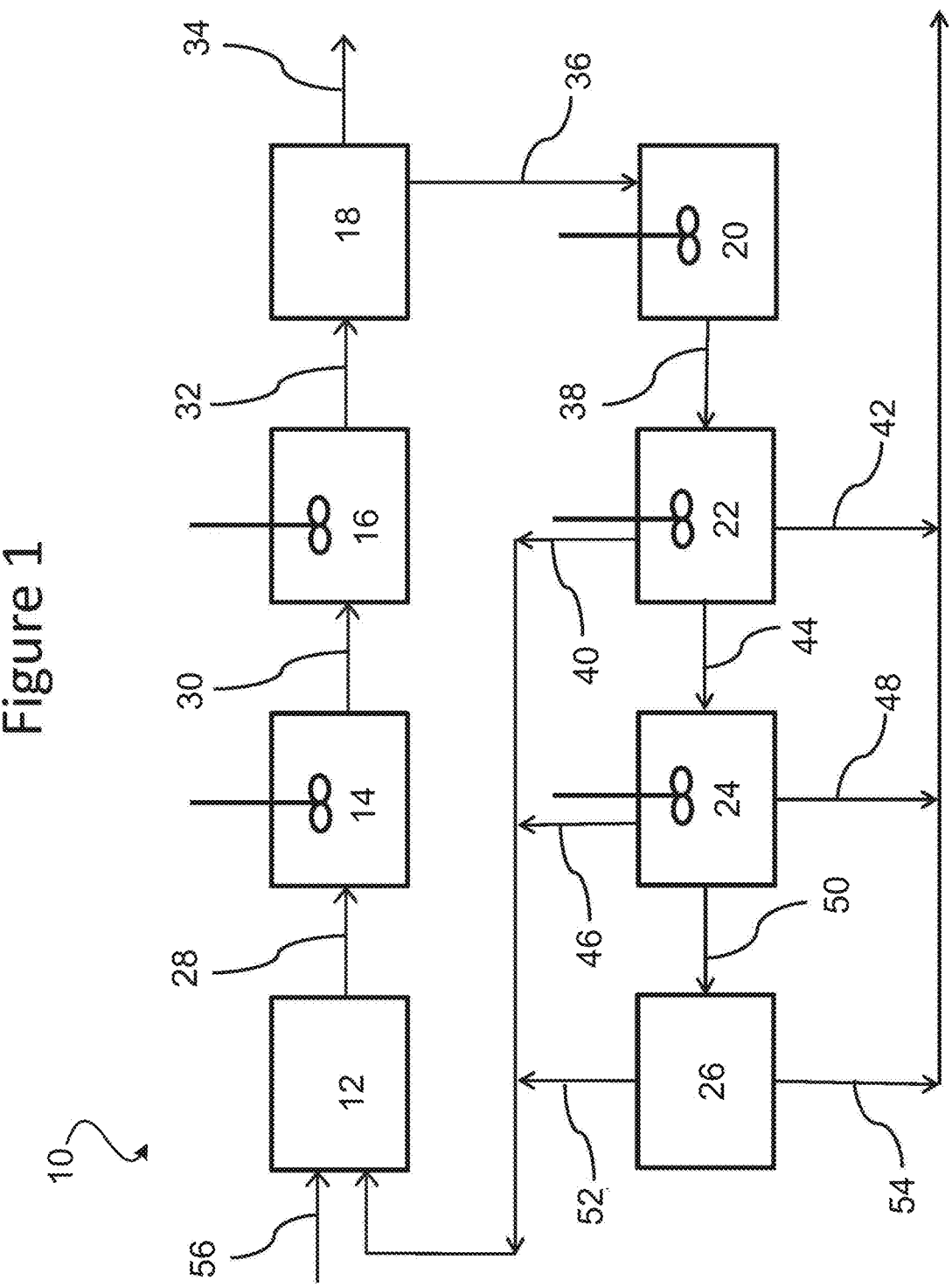
FIG. 1 is a schematic diagram showing a bioprocess of the present invention that treats the trade effluents generated by food waste disposal systems.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Trade effluent wastewater produced from food waste disposal systems or food waste digesters are distinguished by their conventionally higher levels of BOD, COD, TSS, FOG, color and odor, because of the presence of higher levels of fats, oils, fatty acids, proteins, amino acids, lipoproteins, glycoproteins, nucleic acids, variety of carbohydrates, organic acids and volatile organic compounds in the trade effluent.

The present invention relates to an aerobic and/or facultative anaerobic bioprocess method, system and compositions used herein that treat the trade effluent wastewater generated by food waste disposal systems by removing or otherwise significantly reducing the levels of BOD, COD, TSS and FOG, color and malodor from it. The treated trade effluent is of acceptable quality for recycling or discharging in a municipal sewer.

For simplicity and convenience, throughout this document, the following microbial names are termed as following:

*Arthrobacter globiformis* (ATCC 8010) is termed as *Arthrobacter*;

*Bacillus megaterium* (ATCC 14581) is termed as *Bacillus*;

*Micrococcus luteus* (ATCC 4698) is termed as *Micrococcus*;

*Nitrosomonas europaea* (ATCC 25978) is termed as *Nitrosomonas*;

*Pseudomonas stutzeri* (ATCC 17587) is termed as *Pseudomonas*;

*Saccharomyces cerevisiae* (ATCC 9080) is termed as *Saccharomyces*;

*Acidithiobacillus ferrooxidans* (ATCC 23270) is termed as *Acidithiobacillus*;

*Aspergillus oryzae* (ATCC 11866) is termed as *Aspergillus*; and

*Trichoderma reesei* (ATCC 74252) is termed as *Trichoderma*.

The following terms are abbreviated herein or defined as:

'American Type Culture Collection' is abbreviated as ATCC;

'Colony forming unit' is abbreviated as CFU;

'Ultraviolet disinfectant water filter' is abbreviated as UV water filter;

'Trade effluent' is the wastewater discharged from the food waste disposal systems; and 'Food waste disposal systems' comprise food waste disposal systems and equipment, food waste digesters, food waste composters, organic waste treatment equipment and/or any machine or equipment which converts food waste to water.

Preparation of Microorganisms, Enzymes and Compositions
Microorganisms

Enzymes and microorganisms are carefully selected on the basis of their activities and specificities towards biodegradation and assimilation of food waste biomolecules originated from plants and animal sources e.g. proteins, fats, oils, carbohydrates, lipoproteins, glycoproteins, vitamins, minerals, nucleic acids and organic acids. All microorganisms used in the present invention are naturally occurring type strains, and are sourced from ATCC and/or a Microbial Culture Collection Centre. Enzymes may be purchased from a commercial source.

Microbial Production

Microorganisms are grown in their respective growth media and growth conditions listed in Bergey's Manual of Systematic Bacteriology. Active microbial cells are harvested at their mid-log growth phase by centrifugation at 5000 rpm. Cells are washed once with fresh growth medium, and are re-suspended into fresh growth media in an appropriate amount to obtain a bacterial/fungal cell or spore count of $2 \times 10^9$ CFU per mL.

In order to preserve cells/spores for longer period of time, cells of mid-log growth phase are spray dried at 30-45° C. in a commercial spray drier under sterile conditions using a carrier support medium selected from but not limited to, oat bran, corn husk powder, coffee grind, rice bran, wheat bran, maltodextrin or a combination thereof.

Both microbes and enzymes are immobilized on solid support matrices to protect them from harsher environmental conditions prevailing in trade effluents. Trade effluents generally have higher concentrations of BOD, COD, TSS, FOG, $H_2S$, metals and minerals that could be detrimental for the activities of microorganism and enzymes present in Bio-additives therefore it is necessary and useful to immobilize microorganisms and enzymes in order to harness their maximum effectiveness, and to provide a near optimum environment to boost their metabolic system.

Microbe and Enzyme Immobilization Techniques

Example 1: Alginate Immobilization

The microbes *Arthrobacter* and *Bacillus*, and the enzymes catalase, peroxidase and oxidase are immobilized on alginate microbeads. A sterile solution of sodium alginate (30 g/L) was mixed with the bacterial pre-culture to obtain a final concentration of $2 \times 10^9$ cells/mL for each strain. In a separate beaker, the sterile solution of sodium alginate (30 g/L) was mixed with 8500 IU of each enzyme. Ca-alginate beads of about 1-3 mm diameter were obtained by dropping the alginate-cells/alginate-enzyme mixture into a solution of $CaCl_2$ (30 g/L) and mixing them vigorously at 300-400 rpm.

Example 2: Chitosan Immobilization

The microbes, *Micrococcus* and *Nitrosomonas*, and the enzymes, alpha-amylase, alpha-glucanase and alpha-xylanase are immobilized on chitosan microbeads. Source of chitosan was from shrimp exoskeletons with 90% deacetylation. A 2.0% w/w chitosan solution, made in 2.5% w/w acetic acid, is mixed with the bacterial pre-culture to obtain a final concentration of $2 \times 10^9$ cells/mL for each strain. In a separate glass container, above 2.0% chitosan solution is mixed with 8500 IU of each enzyme. Chitosan beads of about 1-3 mm diameter were obtained by dropping the chitosan-cells/chitosan-enzyme mixture into a solution of 0.05% solution of sodium hydroxide under vigorous mixing at 300-400 rpm.

Example 3: Polyacrylamide Immobilization

The microbes *Pseudomonas* and *Saccharomyces*, and the enzymes neutral protease, acidic protease and alkaline protease are immobilized on cationic polyacrylamide. A 2.0% of cationic polyacrylamide solution was made in sterile potassium phosphate buffer (0.25M, pH 7.0). It was mixed with the bacterial pre-culture to obtain a final concentration of $2 \times 10^9$ cells/mL for each strain. In a separate glass container, above 2.0% polyacrylamide solution was mixed with 8500 IU of each enzyme. Polyacrylamide beads of about 1-3 mm diameter were obtained by dropping the polyacrylamide-cells/polyacrylamide-enzyme mixture into normal saline (0.85% of sodium chloride) under vigorous mixing at 300-400 rpm. Polyacrylamides useful in the present invention include anionic, cationic, non-ionic and amphoteric polyacrylamides. Polyacrylamides are polymers formed by polymerization of acrylamide. Preferably the polyacrylamide is an anionic polyacrylamide or cationic polyacrylamide. Anionic polyacrylamide or cationic polyacrylamide are the generic names for a group of very high molecular weight macromolecules produced by the free-radical polymerization of acrylamide and an anionic or a cationic-charged co-monomer. Cationic polyacrylamide or anionic polyacrylamide can be prepared by standard techniques known to those skilled in the art. Both the charge density and the molecular weight can be varied in cationic polyacrylamide or anionic polyacrylamide. By varying the acrylamide/ionic monomer ratio, a charge density from 0 (non-ionic) to 100% along the polymer chain can be obtained. The molecular weight is determined by the type and concentration of the reaction initiator and the reaction parameters. Compounds of multivalent metals that are polymerized may be useful in the present invention. Examples of multivalent metals include polyaluminum sulfate, polyaluminum chloride, aluminum chlorohydrate and calcium hydroxide.

Example 4: Agarose Immobilization

The microbes *Aspergillus* and *Trichoderma*, and the enzymes lipase and phytase are immobilized on agarose microbeads. A 2.0% of agarose solution was made in sterile 50 mM phosphate buffer (pH 8.0) and was mixed with the bacterial pre-culture to obtain a final concentration of $2 \times 10^9$ cells/mL for each strain. In a separate glass container, above 2.0% agarose solution was mixed with 8500 IU of each enzyme. Agarose beads of about 1-4 mm diameter were obtained by dropping the agarose-cells/agarose-enzyme mixture into 100 mM phosphate buffer (pH 8.0) under vigorous mixing at 300-400 rpm.

Example 5: K-Carrageenan Immobilization

The microbe *Acidithiobacillus*, and the enzymes pectinase and beta-xylanase are immobilized on k-Carrageenan microbeads. A 4% of k-Carrageenan solution was made in sterile deionized water and was mixed with the bacterial pre-culture to obtain a final concentration of $2 \times 10^9$ cells/mL for each strain. In a separate glass container, above 4% k-Carrageenan was mixed with 8500 IU of each enzyme. k-Carrageenan beads of about 1-4 mm diameter were obtained by dropping the k-Carrageenan-cells/k-Carrageenan-enzyme mixture into normal saline (0.85% NaCl) under vigorous mixing at 300-400 rpm.

Compositions of Bio-Additives 1, 2 and 3.

Compositions of bio-additives 1, 2 and 3 comprise a group of highly selective and effective microorganisms and enzymes that are immobilized on a carrier support material from a group of alginate, chitosan, polyacrylamides, k-carrageenan and agarose. Microorganisms are selected from a class of Bio-safety level-1 ATCC type strains that are naturally occurring and categorized as GRAS (generally regarded as safe). Bio-additives 1, 2 and 3 comprise at least six different strains of bacteria, fungi, and yeast or a combination thereof from group of *Arthrobacter, Bacillus, Micrococcus, Nitrosomonas, Pseudomonas, Saccharomyces, Acidithiobacillus, Aspergillus* and *Trichoderma*. At least six enzymes are selected from the class of hydrolase, oxidoreductase, lyase, transferase, isomerase and a combination thereof from a group of catalase, alpha-amylase, peroxidase, oxidase, lipase, neutral protease, alpha-glucanase, phytase, acidic protease, alkaline protease, pectinase, alpha-xylanase, and beta-xylanase.

In a preferred embodiment, bio-additives 1, 2 and 3 are immobilized on carrier support matrices of alginate, chitosan, polyacrylamides, k-carrageenan and/or agarose as described herein.

In yet another preferred embodiment, Bio-additive 1 comprises six microbial strains of *Arthrobacter, Bacillus, Micrococcus, Nitrosomonas, Pseudomonas, Saccharomyces* at a proportions of 15%, 12%, 17%, 16%, 20% and 20%, respectively, with each strain concentration of about $2\times10^9$ cfu per mL. Bio-additive 1 also comprises six enzymes preferably catalase, alpha-amylase, peroxidase, oxidase, lipase, neutral protease, with each enzyme at a concentration of about 8500 IU per mL.

In a preferred embodiment, Bio-additive 2 comprises five microbial strains of *Nitrosomonas, Pseudomonas, Acidithiobacillus, Aspergillus* and *Trichoderma* at a ratio of 20% w/w of each strain, and with each strain concentration of $2\times10^9$ cfu per mL. Bio-additive 2 also comprises six enzymes preferably alpha-glucanase, phytase, acidic protease, alkaline protease, pectinase and alpha-xylanase, with each enzyme at a concentration of about 8500 IU per mL.

In a preferred embodiment, Bio-additive 3 comprises four microbial strains of *Arthrobacter, Micrococcus, Acidithiobacillus* and *Pseudomonas* at a ratio of 25% each w/w of each strain, and with each strain concentration of $2\times10^9$ cfu per mL. Bio-additive 3 also comprises four enzymes preferably peroxidase, oxidase, lipase and beta-xylanase with each enzyme at a concentration of about 8500 IU per mL. Bioprocess Method and System.

FIG. 1 is a schematic chart of bioprocess embodiment 10. All mixing tanks and reactors 12, 14, 16, 18, 20, 22, 24 and 26, are connected to each other by transfer pipes, transfer pumps and sump pumps. In FIG. 1, a food waste disposal system 12 is of a size that treats food waste of varying capacity ranging from 2 kg per day to 2000 kg per day. The nature and type of food waste inside the food waste disposal system 12 can be one or more of mixed produce, fruits, vegetables, seafoods, fish, mixed meats, pork, beef, chicken, bakery, dough, coffee waste, processed foods, fried food, biodegradable plastics (e.g. PLA and corn-based plastics), and/or a combination thereof.

Trade effluent 28 is discharged from food waste disposal system 12 and enters mixing tank 14. Freshwater 56 is injected into food waste disposal system 12 in order to carry out the food waste digestion and assimilation process.

Example concentrations of Bio-additives 1, 2, 3, coagulants/flocculants and hydrogen peroxide, and their mixing times are given below in ranges. Their addition concentrations and mixing times depend on the concentrations of BOD, COD, TSS, FOG, color and malodor in the trade effluent.

The pH of trade effluent is regulated in tank 14 with acids and/or bases, depending on the nature and pH of food waste, but not limited to oxalic acid, boric acid, succinic acid, citric acid, hydrochloric acid, acetic acid, sulfuric acid, sodium bicarbonate, sodium carbonate, glycine, borax, potassium hydrogen phosphate, Tris (hydromethyl aminomethane) or a combination thereof. In a preferred embodiment, citric acid and sodium carbonate are used in range of 0.1-5.0% (w/w) to regulate the pH level of trade effluent in range of 3.2-8.5.

Bio-additive 1 is added to mixing tank 14 at a concentration range of 0.1-6.0% w/w by means of a dosing pump and mixed for 0.1-5.0 hours. Thereafter, trade effluent 30 is passed into mixing tank 16 where coagulants/flocculants are injected by means of a dosing pump and mixed for 0.5-5 hours. The coagulants/flocculants are selected from a group of polyacrylamides that may include anionic, cationic, nonionic and amphoteric polyacrylamides, and polymerized multivalent metals that may include polyaluminum sulfate, polyaluminum chloride, aluminum chlorohydrate and calcium hydroxide. The processes such as flocculation and coagulation may or may not be aided mechanically by means of gentle stirring of the trade effluent in order to enhance the interaction of small particles and promote the formation of larger flocs of precipitated, aggregated or flocculated material is allowed to filter out is particularly useful in the practice of the present invention. In a preferred embodiment, at least 0.001%-6.0% cationic polymer polyacrylamide is mixed in tank 16 for coagulation/flocculation step. In some cases, polyaluminum chloride is mixed in the range 0.001-6.0% in tank 16 to promote coagulation/flocculation. Treated trade effluent 32 from tank 16 is passed through filter device 18. Filter device 18 may comprise one or more of a filter press, centrifuge, belt press filter, screw press filter, ultra-filter, or other devices that are known to remove water from the sludge.

Filtered sludge 34 is removed from the filter device as solid waste. Solid sludge waste 34 comprises undigested food waste components and some of the insoluble BOD/COD components. The treated sludge discharged from the filter device can be dried and comminuted to provide a free flowing particulate form of material. Drying can be done in open air, by spray dryer or by a gas-fired dryer. Comminuting can be done with a mill such as a hammer mill. The dried material thus obtained can be used as a fine marketable nutrient fertilizer.

Trade effluent 36 from tank 18 is then transferred to the next mixing tank 20 for further treatment. Bio-additive 2 is added at a concentration range of 0.1-6.0% w/w and mixed in tank 20 for 0.1-5 hours with aeration.

After mixing, trade effluent 38 from tank 20 is transferred to tank 22 which is equipped with an aeration system. Bio-additive 3 is added at a concentration range of 0.1-6.0% w/w to tank 22 and mixed for 0.5-5 hours with aeration. Treated trade effluent 40 from tank 22 is either recycled back into the food waste disposal system 12 or it can be safely discharged 42 directly into a sewer.

In a preferred embodiment, trade effluent 44 enters into tank 24 where hydrogen peroxide is added at a concentration of 0.1-35% w/w and mixed for 0.1-5.0 hours with aeration. The treated trade effluent 46 from tank 24 is either recycled back into the food waste disposal system 12 or it can be safely discharged 48 directly into a sewer.

In a preferred embodiment, treated trade effluent 50 passes through a UV disinfectant water filter device 26 to remove unwanted microorganisms. Finally, the treated trade effluent from UV disinfectant water filter device 26 is either recycled 52 back, into the food waste disposal system 12 or it can be safely discharged 54 into the sewer.

Trade effluent can be treated by hydrogen peroxide and UV water filter in the present trade effluent treatment process where the rotten food waste may contain *E. coli, Salmonella, Shigella* or other suspected pathogenic microorganisms. Some municipalities are concerned about discharge of live microbes/enzymes down the sewer. Municipal authorities may be concerned that microbes/enzymes may harm their sewer pipes, although arguably there is no current scientific data or evidence to support such a claim. Microbes/enzymes help degrading organic load in municipal wastewater treatment plant where wastewater is collected and treated from all sources. Embodiments of the present invention permit a continuous effluent purifying system that utilizes hydrogen peroxide and ultraviolet (UV) energy as reliable disinfection/sterilization process. The UV energy and hydrogen peroxide destroy up to 99.99% of nearly all forms of harmful microorganisms and pathogens in the trade effluent and prevents them from entering into sewer pipes. The hydrogen peroxide disappears spontaneously by breaking down into reactive oxygen and water molecules, and no residual hydrogen peroxide is left in the treated trade effluent wastewater.

Once the treated trade effluent is sterilized, it can be recycled, reused and/or when necessary can be disposed of safely in a municipal sewer.

Alternatively, treated trade effluent can be disinfected with chemicals e.g. ozone, chlorine and/or chlorine dioxide but chemically disinfected water can't be recycled back into food waste disposal systems because of the detrimental effects of residual chemicals on the food waste digestion process.

Recycling of treated trade effluent can be done up to 5-7 times before it is finally discharged into sewer. The number of times the treated trade effluent can be recycled is limited by the fact that with each time the trade effluent is recycled, there is an accumulation of dead-end metabolites and recalcitrant compounds that are detrimental to microbial/enzyme bioprocess inside the food waste disposal system 12 and are detrimental to the trade effluent treatment system outside the food waste disposal system.

In a preferred embodiment, the present bioprocess comprises a PLC (Programmable Logic Controller) control panel that controls the trade effluent flow rates from one tank to the next, pH regulation in tank 14, dosing of Bio-additives 1, 2 and 3 in tanks 14, 20 and 22 respectively, and functioning of filter device 18, dosing of hydrogen peroxide in tank 24, aeration in tanks 20, 22, and 24, dosing of coagulants/flocculants in reactor 16 and recycling of treated trade effluent back into food waste disposal system 12.

The trade effluent treatment system of the present invention can comprise several alternative embodiments. For example, in a preferred form, up to 98% reduction of BOD, COD, TSS FOG, color and malodor is achieved within one hour of reaction time, the same results can be achieved within 0.5 hour or at 2 or more hours by adjusting the dosing of Bio-additives 1, 2 and 3 at higher or lower levels.

The rate of trade effluent discharge from food waste disposal systems varies from 2 liters per hour to 400 liters per hour depending on the size and digestion capacity of waste disposal systems therefore the effluent treatment method and system must be rapid, efficient and effective enough to treat and recycle the effluent water back into food waste disposal system within a short time of 0.5-2 hours. The present invention can treat the trade effluent, within 0.5-1 hour of treatment time, at a flow rate of 100 liters per hour.

At present, the commercial food waste disposal systems require extensive maintenance and service hours. In most cases, it requires at least once a week visit by a skilled person to check on blockages by waste effluent sludge and malodor issues. In some extreme cases, the food waste disposal systems require urgent attention and service on daily basis. In North America and Europe where costs of skilled labor is relatively higher, the maintenance becomes a significant additional cost to operate food waste disposal systems. The present invention reduces the overall operational cost of running a food waste disposal system by treating trade effluent to meet municipal discharge standards, by reducing labor and maintenance cost, and by reducing the usage of fresh water.

In another alternative embodiment, the filter device 18 in FIG. 1 can have a multistage filter assembly instead of a single stage filtration assembly shown herein. Multistage filter assembly is selected from filter press, centrifuge, belt press, screw press, ultra-filter, or other devices that removes water from the sludge. Further, the multistage assembly can consist of two or more stages. In another embodiment of the present invention, transfer pumps can be placed between the various filters stages of present invention.

While this invention, in a preferred form, has been described in connection with the trade effluent treatment, the same bioprocess can be used to treat the wastewaters from meat processing, fruits, vegetables, fish, pork, beef, chicken, dairy processing, mixed food processing plants, municipalities, aquaculture, agriculture, and industries manufacturing bio-products of plants and animals origin for the reason that food processing wastewaters contain higher levels of fats, oils, fatty acids, proteins, amino acids, vitamins, lipoproteins, glycoproteins, nucleic acids, variety of carbohydrates, organic acids and volatile organic compounds, and the present invention has the necessary elements to treat higher levels of BOD, COD, TSS, FOG, color and odor.

In an alternative embodiment, the present invention can be implemented on a large scale where the flow rate of trade effluent or food processing wastewater can be as high as 5000 liters per hour. Higher effluent treatment capacity can be achieved by changing the size of mixing tanks and reactors, adjusting and controlling the flow rate of effluent, altering the dosing amount of Bio-additives 1, 2, 3, coagulants/flocculants, hydrogen peroxide, and pH control liquids, changing the size of connecting pipes and valves, installing high strength UV water filter and so on. In a preferred embodiment, the present bioprocess can operate with a trade effluent flow rate from 2 liters per hour to 5000 liters per hour discharged from the food waste disposal system.

The present invention will be further clarified by the following specific examples, which are intended to be purely exemplary of the present invention, and the scope of the invention is not limited to the examples.

Example 1: Determining Optimum pH and Temperature of Bio-Additives 1, 2 and 3 Activities To determine optimum pH for activities of Bio-additives, experiments were performed at different pH of trade effluent at an increment of pH value of 0.5 while keeping reaction temperature constant at 25° C. Acidic pH is adjusted with 5% citric acid solution, and alkaline pH is adjusted with 5% sodium bicarbonate solution. To determine optimum temperature for activities of Bio-additives, experiments were performed at different temperatures at an increment of 5° C. while keeping reaction pH at 5.0. A 0.5% of Bio-additives 1, 2 and 3 are mixed separately to 20 liters of trade effluent from food waste disposal system and reaction was performed for 1 hour. A 0.5% of Bio-additive dosing corresponds to 100 mL of Bio-additive is added to 20 liters of trade effluent. After 1 hour reaction period, BOD of treated trade effluent is tested as an indicator of the activities of Bio-additives 1, 2 and 3, and results are shown in Table 1.

TABLE 1

| pH and temperature optima of Bio-additives. | | |
|---|---|---|
| Product | Broad pH optima | Broad Temperature optima |
| Bio-additive 1 | 3.0-8.5 | 20-75° C. |
| Bio-additive 2 | 4.0-8.5 | 22-70° C. |
| Bio-additive 3 | 3.5-9.5 | 18-75° C. |

Example 2: Effect of Bio-Additive 1 on Reduction of Trade Effluent Parameters

Figure 2:
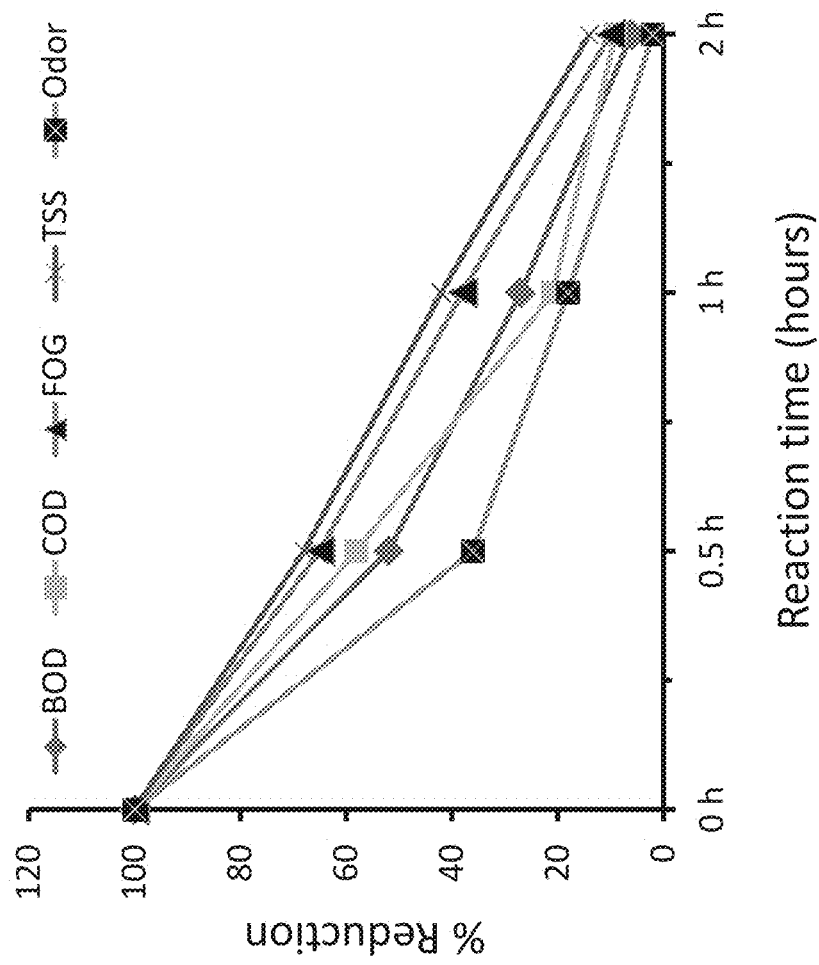
FIG. 2 is a graph showing the effect of Bio-additive 1 on reduction of trade effluent wastewater parameters, BOD, COD, TSS, FOG and odor.

Bio-additive 1 is mixed, at a concentration of 0.5%, with 20 liters of trade effluent from food waste disposal system, and stirred gently for up to 2 hours at 100 rpm at 25° C. Trade effluent samples were withdrawn periodically at 0 hour, 0.5 hour, 1 hour and 2 hours, and tested for residual BOD, COD, FOG, TSS and odor using APHA's Standard Methods for the Examination of Water and Wastewater. The results in FIG. 2 demonstrate that all tested parameters were reduced by up to 70% and 96% after 1 hour and 2 hours of reaction times, respectively. 100% values of BOD, COD, FOG, TSS and odor (in terms of $H_2S$) are 5340, 7250, 1560, 4820 and 17 mg/L, respectively.

Example 3: Effect of Bio-Additive 2 on Reduction of Trade Effluent Parameters

Figure 3:
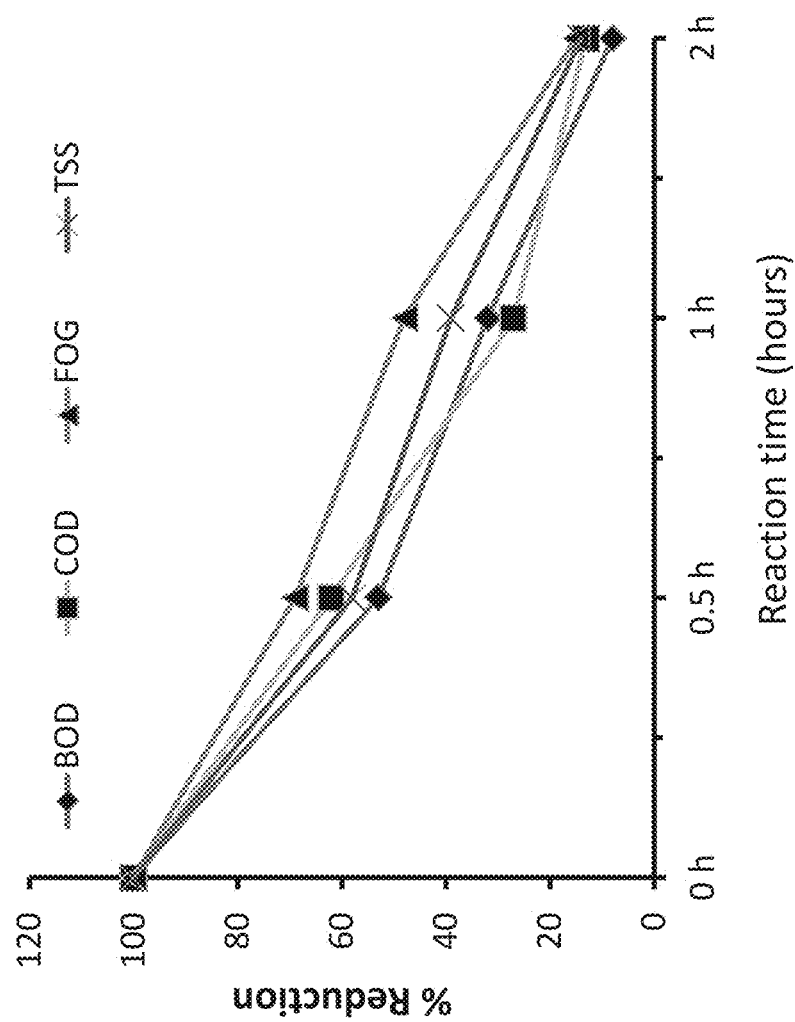
FIG. 3 is a graph showing the effect of Bio-additive 2 on reduction of trade effluent wastewater parameters, BOD, COD, TSS and FOG.

Bio-additive 2 was mixed, at a concentration of 0.5%, with 20 liters of trade effluent from food waste disposal system, and stirred gently for up to 2 hours at 100 rpm at 25° C. Trade effluent samples were withdrawn periodically at 0 hour, 0.5 hour, 1 hour and 2 hours, and tested for residual BOD, COD, FOG and TSS using APHA's Standard Methods for the Examination of Water and Wastewater. The results in FIG. 3 demonstrate that all tested parameters were reduced by up to 75% and 92% after 1 hour and 2 hours of reaction times, respectively. 100% values of BOD, COD, FOG and TSS are 5340, 7250, 1560 and 4820 mg/L, respectively.

Example 4: Effect of Bio-Additive 3 on Reduction of Trade Effluent Parameters

Figure 4:
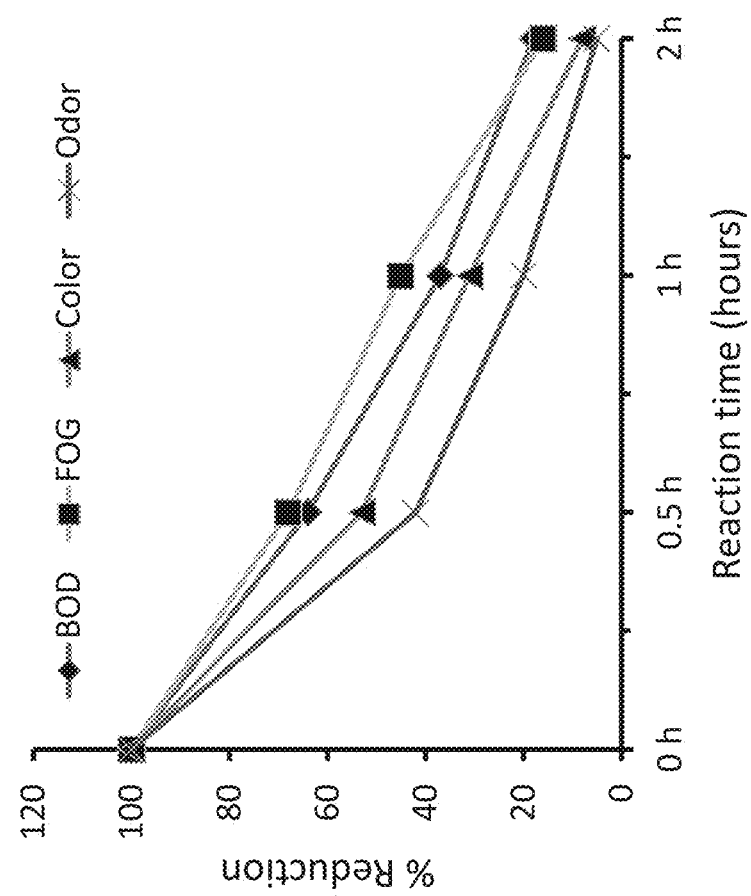
FIG. 4 is a graph showing the effect of Bio-additive 3 on reduction of trade effluent wastewater parameters, BOD, FOG, color and odor.

Bio-additive 3 was mixed, at a concentration of 0.5%, with 20 liters of trade effluent from food waste disposal system, and stirred gently for up to 2 hours at 100 rpm at 25° C. Trade effluent samples were withdrawn periodically at 0 hour, 0.5 hour, 1 hour and 2 hours, and tested for residual BOD, FOG, color and odor using APHA's Standard Methods for the Examination of Water and Wastewater. The results in FIG. 4 demonstrate that all tested parameters were reduced by up to 65% and 94% after 1 hour and 2 hours of reaction times, respectively. 100% values of BOD, FOG and odor (in terms of $H_2S$) are 5340, 1560 and 17 mg/L, respectively. 100% value of color is 950 Platinum-Cobalt units.

Figure 5:
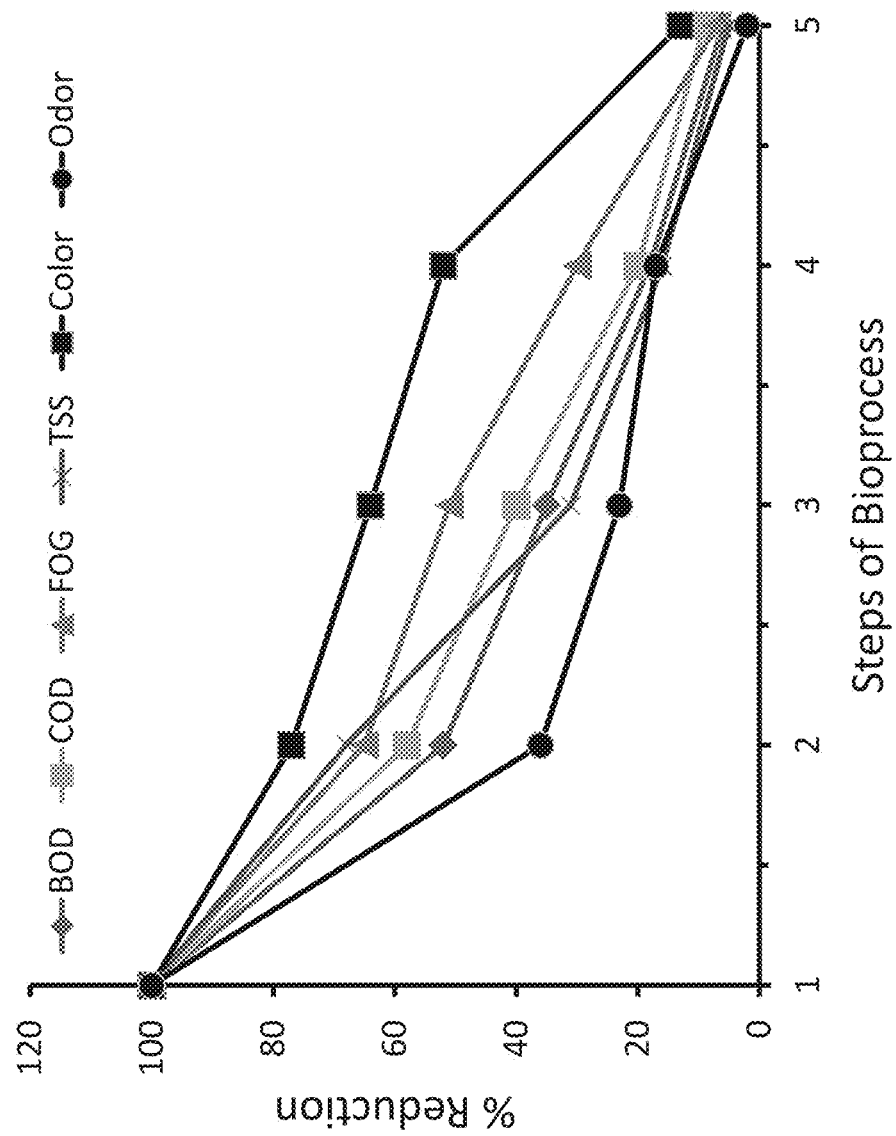
FIG. 5 is a graph showing the reduction of BOD, COD, TSS, FOG, color and odor in a continuous bioprocess of trade effluent wastewater treatment.

Example 5: Effect of Complete Bioprocess on Reduction of Trade Effluent Parameters Reduction of BOD, COD, FOG, TSS, color and odor (in terms of $H_2S$) of trade effluent is exemplified in a continuous bioprocess as shown in schematic diagram FIG. 1. Experiment is performed with 200 liters of trade effluent from a food waste disposal system. Bio-additive 1, 2 and 3 were added at a concentration level of 0.5% each. One hour gentle stirring was done at 100 rpm at 25° C. after each addition of Bio-additive step. Results of five sequential steps of bioprocess are shown in FIG. 5, and bioprocess steps are given on horizontal axis. Step 1 is the starting trade effluent wastewater without any additive. In step 2, the pH is regulated to 5.0 and Bio-additive 1 is added and stirred for one hour. In step 3, coagulant/flocculant are mixed and stirred for 30 minutes and then passed through a filter device. Step 4 is when Bio-additive 2 is added and stirred for one hour with aeration. In step 5, Bio-additive-3 is added and stirred for one hour with aeration. Water samples were withdrawn after each step of the bioprocess, and tested for BOD, COD, FOG, TSS, color and malodor (in terms of $H_2S$) using APHA's Standard Methods for the Examination of Water and Wastewater. 100% values of BOD, COD, FOG, TSS and odor are 5340, 7250, 1560, 4820 and 17 mg/L, respectively. 100% value of color is 950 Platinum-Cobalt units.

Example 5 is an overview of the present invention that is a rapid bioprocess that removes or otherwise reduces the BOD, COD, TSS FOG, color and malodor from the trade effluent, discharged from food waste disposal systems, by up to 98% within few hours. The present bioprocess and compositions together assist most of the commercial and domestic food waste disposal systems meeting the global municipal wastewater discharge standards set by USEPA, Environment Canada and the United Nations.

It is intended that the present specification and examples be considered as exemplary only with a true scope and spirit of the invention being indicated by the following claims and equivalents thereof.

Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

As will be apparent to those skilled in the art in the light of the foregoing disclosure the present invention is not limited by what has been particularly shown and described herein. Rather the scope of the present invention includes both combinations and sub-combinations of the features described hereinabove as well as modifications and variations thereof which would occur to a person of skill in the art upon reading the foregoing description and which are not in the prior art. Furthermore, many alterations and modifications are possible in the practice of this invention without departing from the spirit or scope thereof. Accordingly, the scope of the invention is to be construed in accordance with the substance defined by the following claims.

What is claimed is:

1. A method of treating trade effluent from a food waste disposal system comprising:
    exposing said trade effluent sequentially to each of first, second and third bio-additives respectively to produce a treated effluent, wherein
        the first bio-additive comprises immobilized microbial strains and immobilized isolated enzymes;
        the second bio-additive comprises immobilized microbial strains and immobilized isolated enzymes; and
        the third bio-additives comprises immobilized microbial strains and immobilized isolated enzymes;
    wherein each one of the immobilized microbial strains and immobilized isolated enzymes is immobilized separately.

2. The method of claim 1 wherein said immobilized microbial strains and said immobilized isolated enzymes of each of the first, second and third bio-additives are immobilized on carrier support matrices chosen from alginate, chitosan, polyacrylamides, k-carrageenan and/or agarose.

3. The method of claim 2 wherein each one of said first, second and third bio-additives comprise at least six different strains of bacteria, fungi and/or yeast independently selected from a group of *Arthrobacter, Bacillus, Micrococcus, Nitrosomonas, Pseudomonas, Saccharomyces, Acidithiobacillus, Aspergillus* and *Trichoderma*.

4. The method of claim 3 wherein each one of said first, second and third bio-additives comprise at least six different isolated enzymes independently selected from hydrolase, oxidoreductase, lyase, transferase, isomerase, catalase, alpha-amylase, peroxidase, oxidase, lipase, neutral protease, alpha-glucanase, phytase, acidic protease, alkaline protease, pectinase, alpha-xylanase, and beta-xylanase.

5. The method of claim 1 wherein said first bio-additive comprises immobilized microbial strains of *Arthrobacter, Bacillus, Micrococcus, Nitrosomonas, Pseudomonas*, and *Saccharomyces* at proportions of approximately 15%, 12%, 17%, 16%, 20% and 20%, respectively, with each strain at a concentration of about $2 \times 10^9$ CFU per mL; and wherein said first bio-additive further comprises immobilized isolated enzymes catalase, alpha-amylase, peroxidase, oxidase, lipase, neutral protease, each at a concentration of about 8500 IU per mL.

6. The method of claim 5 wherein said second bio-additive comprises immobilized microbial strains of *Nitrosomonas, Pseudomonas, Acidithiobacillus, Aspergillus* and *Trichoderma* at a ratio of 20% w/w of each strain, and with each strain at a concentration of $2 \times 10^9$ CFU per mL; and wherein said second bio-additive further comprises immobilized isolated enzymes alpha-glucanase, phytase, acidic protease, alkaline protease, pectinase and alpha-xylanase, with each enzyme at a concentration of about 8500 IU per mL.

7. The method of claim 6 wherein said third bio-additive comprises immobilized microbial strains of *Arthrobacter, Micrococcus, Acidithiobacillus* and *Pseudomonas* at a ratio of 25% each w/w of each strain, and with each strain at a concentration of $2 \times 10^9$ CFU per mL; and wherein said third bio-additive further comprises immobilized isolated enzymes peroxidase, oxidase, lipase and beta-xylanase each at a concentration of about 8500 IU per mL.

8. The method of claim 7 further comprising transferring said treated effluent back into said food waste disposal system.

9. The method of claim 1, wherein each one of said first, second and third bio-additives independently comprises:
as the immobilized microbial strains, one or more of:
*Micrococcus* or *Nitrosomonas* immobilized on chitosan;
*Pseudomonas* or *Saccharomyces* immobilized on polyacrylamide;
*Aspergillus* or *Trichoderma* immobilized on agarose;
*Acidithiobacillus* immobilized on k-carrageenan; or
*Arthrobacter* or *Bacillus* immobilized on alginate; and
as the immobilized isolated enzymes, one or more of:
alpha-amylase, alpha-glucanase or alpha-xylanase immobilized on chitosan;
neutral protease, acidic protease or alkaline protease immobilized on polyacrylamide;
lipase or phytase immobilized on agarose;
pectinase or beta-xylanase immobilized on k-carrageenan; or
catalase, peroxidase or oxidase immobilized on alginate.

10. The method of claim 1, wherein each one of said first, second and third bio-additives independently comprises:
as the immobilized microbial strains, six or more of:
*Micrococcus* or *Nitrosomonas* immobilized on chitosan;
*Pseudomonas* or *Saccharomyces* immobilized on polyacrylamide;
*Aspergillus* or *Trichoderma* immobilized on agarose;
*Acidithiobacillus* immobilized on k-carrageenan; or
*Arthrobacter* or *Bacillus* immobilized on alginate; and
as the immobilized isolated enzymes, six or more of:
alpha-amylase, alpha-glucanase or alpha-xylanase immobilized on chitosan;
neutral protease, acidic protease or alkaline protease immobilized on polyacrylamide;
lipase or phytase immobilized on agarose;
pectinase or beta-xylanase immobilized on k-carrageenan; or
catalase, peroxidase or oxidase immobilized on alginate.

11. The method of claim 1, comprising:
in a first step, mixing the trade effluent with the first bio-additive for up to 5 hours;
in a second step, mixing the trade effluent from the first step with the second bio-additive for up to 5 hours;
in a third step, mixing the trade effluent from the second step with the third bio-additive for up to 5 hours to produce a treated effluent.

12. An apparatus for treating trade effluent from a food waste disposal system comprising:
a first connector connecting said food waste disposal system to a first tank, said first tank configured for receiving said trade effluent and mixing said trade effluent with a first bio-additive;
a second connector connecting said first tank to a second tank for transferring said trade effluent into said second tank;
a third connector connecting said second tank to a first filter device, said first filter device filtering out and removing sludge waste from said trade effluent;
a fourth connector connecting said first filter device to a third tank, said third tank configured for mixing said trade effluent with a second bio-additive;
a fifth connector connecting said third tank to a fourth tank, said fourth tank configured to mix said trade effluent with a third bio-additive wherein said trade effluent and said third bio-additive mixture becomes treated effluent; and
a discharge outlet for discharging said treated effluent from said fourth tank,
wherein
the first bio-additive comprises immobilized microbial strains and immobilized isolated enzymes;
the second bio-additive comprises immobilized microbial strains and immobilized isolated enzymes; and
the third bio-additives comprises immobilized microbial strains and immobilized isolated enzymes;
wherein each one of the immobilized microbial strains and immobilized isolated enzymes is immobilized separately.

13. The apparatus of claim 12 wherein each of said first, second and third bio-additives comprise immobilized microbial strains and immobilized isolated enzymes that are immobilized on carrier support matrices of alginate, chitosan, polyacrylamides, k-carrageenan and/or agarose.

14. The apparatus of claim 13 wherein each one of said first, second and third bio-additives independently comprise at least six different strains of bacteria, fungi and/or yeast selected from a group of *Arthrobacter, Bacillus, Micrococcus, Nitrosomonas, Pseudomonas, Saccharomyces, Acidithiobacillus, Aspergillus* and *Trichoderma*.

15. The apparatus of claim 14 wherein each one of said first, second and third bio-additives independently comprise at least six different isolated enzymes selected from hydrolase, oxidoreductase, lyase, transferase, isomerase, catalase, alpha-amylase, peroxidase, oxidase, lipase, neutral protease, alpha-glucanase, phytase, acidic protease, alkaline protease, pectinase, alpha-xylanase, and beta-xylanase.

16. The apparatus of claim 12, comprising a sixth connector connecting said discharge outlet to said food waste disposal system.

17. The apparatus of claim 12, wherein each one of said first, second and third bio-additives independently comprises:
  as the immobilized microbial strains, one or more of:
    *Micrococcus* or *Nitrosomonas* immobilized on chitosan;
    *Pseudomonas* or *Saccharomyces* immobilized on polyacrylamide;
    *Aspergillus* or *Trichoderma* immobilized on agarose;
    *Acidithiobacillus* immobilized on k-carrageenan; or
    *Arthrobacter* or *Bacillus* immobilized on alginate; and
  as the immobilized isolated enzymes, one or more of:
    alpha-amylase, alpha-glucanase or alpha-xylanase immobilized on chitosan;
    neutral protease, acidic protease or alkaline protease immobilized on polyacrylamide;
    lipase or phytase immobilized on agarose;
    pectinase or beta-xylanase immobilized on k-carrageenan; or
    catalase, peroxidase or oxidase immobilized on alginate.

18. The apparatus of claim 12, wherein each one of said first, second and third bio-additives independently comprises:
  as the immobilized microbial strains, six or more of:
    *Micrococcus* or *Nitrosomonas* immobilized on chitosan;
    *Pseudomonas* or *Saccharomyces* immobilized on polyacrylamide;
    *Aspergillus* or *Trichoderma* immobilized on agarose;
    *Acidithiobacillus* immobilized on k-carrageenan; or
    *Arthrobacter* or *Bacillus* immobilized on alginate; and
  as the immobilized isolated enzymes, six or more of:
    alpha-amylase, alpha-glucanase or alpha-xylanase immobilized on chitosan;
    neutral protease, acidic protease or alkaline protease immobilized on polyacrylamide;
    lipase or phytase immobilized on agarose;
    pectinase or beta-xylanase immobilized on k-carrageenan; or
    catalase, peroxidase or oxidase immobilized on alginate.

* * * * *